(12) United States Patent
Li et al.

(10) Patent No.: US 7,636,197 B2
(45) Date of Patent: Dec. 22, 2009

(54) HOUSING WITH THREE-DIMENSION APPEARANCE

(75) Inventors: Wei Li, Shenzhen (CN); Zhong-Cheng Wu, Shenzhen (CN); Zhang-Geng Huang, Shenzhen (CN); Zhang-Qi Li, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 11/959,301

(22) Filed: Dec. 18, 2007

(65) Prior Publication Data
US 2009/0073568 A1   Mar. 19, 2009

(30) Foreign Application Priority Data
Sep. 18, 2007   (CN) .......................... 200710201752

(51) Int. Cl.
*G02B 27/10* (2006.01)
(52) U.S. Cl. ..................................... 359/620; 359/626
(58) Field of Classification Search ......... 359/619–620, 359/625–626
See application file for complete search history.

(56) References Cited

U.S. PATENT DOCUMENTS

2005/0180020 A1 *   8/2005   Steenblik et al. ............ 359/626

* cited by examiner

*Primary Examiner*—Scott J Sugarman
*Assistant Examiner*—Dawayne A Pinkney
(74) *Attorney, Agent, or Firm*—Steven M. Reiss

(57) ABSTRACT

A housing (10) with three-dimension appearance includes a transparent substrate (11), a micro lens array (12) formed on one surface of the transparent substrate, and a decorative layer (13) formed on another surface of the transparent substrate at an opposite side to the micro lens array. A method for making the housing is also provided.

1 Claim, 4 Drawing Sheets

HOUSING WITH THREE-DIMENSION APPEARANCE

CROSS-REFERENCE TO RELATED APPLICATIONS

This application claims all benefits accruing under 35 U.S.C. §119 from China Patent Application No. 200710201752.4, filed on Sep. 18, 2007 in the China Intellectual Property Office, the disclosure of which is incorporated herein by reference.

BACKGROUND OF THE INVENTION

1. Field of the Invention

The present invention relates to housings, particularly to a housing with three-dimension appearance.

2. Description of Related Art

Mobile devices, such as mobile telephones, personal digital assistants, or MP3 players, enable consumers to enjoy the convenience of high technology services, almost anytime and at virtually any location. These mobile devices often employ any of a variety of decorative housings to attract consumers. Paints and inks are typically applied onto surfaces of the housings to provide the necessary decorative appearance.

Typical paints and inks can provide two-dimension appearance, however, cannot provide three-dimension appearance on the surface of a housing. A housing with three-dimension appearance on its surface is more apparent and attractive to consumers.

Therefore, a housing with three-dimension appearance is desired in order to attract the users.

SUMMARY OF THE INVENTION

In one embodiment thereof, a housing with three-dimension appearance is provided. The housing includes a transparent substrate, a micro lens array formed on one surface of the transparent substrate, and a decorative layer formed on another surface of the transparent substrate at an opposite side to the micro lens array.

Other advantages and novel features will become more apparent from the following detailed description of preferred embodiments when taken in conjunction with the accompanying drawings.

BRIEF DESCRIPTION OF THE DRAWINGS

Many aspects of the housing with three-dimension appearance can be better understood with reference to the following drawing. The components in the drawing are not necessarily drawn to scale, the emphasis instead being placed upon clearly illustrating the principles of the housing with three-dimension appearance. Moreover, in the drawing like reference numerals designate corresponding parts throughout the several views.

DETAILED DESCRIPTION OF THE INVENTION

Figure 1:
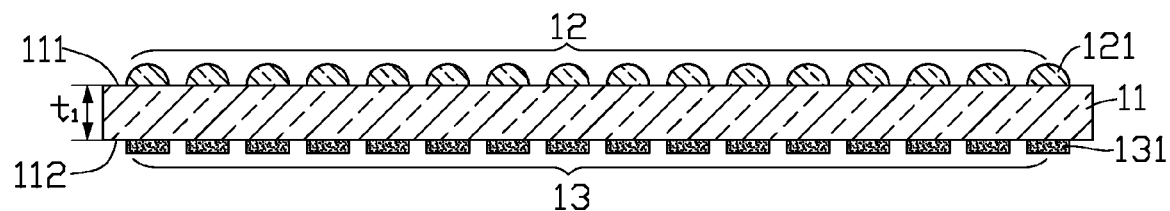
FIG. 1 is a cross-sectional view of a first embodiment of a housing with three-dimension appearance.

Referring to FIG. 1, in a present embodiment, a first housing 10 includes a transparent substrate 11, a micro lens array 12 formed on a first surface 111 of the transparent substrate 11, and a decorative layer 13 formed on a second surface 112 of the transparent substrate 11 at an opposite side to the first surface 111, i.e., the transparent substrate 11 is sandwiched between the micro lens array 12 and the decorative layer 13.

The transparent substrate 11 is made of a transparent material such as glass or a transparent plastic selected from the group consisting of acrylonitrile-butadiene-styrene, poly methylmethacrylate, poly vinyl chloride, and any combine thereof. A thickness of the transparent substrate 11 symbolized as $t_1$ is in an approximate range from 0.5 mm to 2 mm.

The micro lens array 12 includes a plurality of micro lenses 121. Each of the micro lenses 121 is made of an optical polymer mixture. The optical polymer mixture should preferably be photosensitive polymer ink, which includes a urethane acrylate component in an approximate range from 55 wt % (percent by weight) to 90 wt %, photo initiators in an approximate range from 5 wt % to 10 wt %, and additives in an approximate range from 5 wt % to 10 wt %. Each of the micro lenses 121 can be a hemisphere or a spherical segment, and has a diameter of about 0.2 mm to 1.0 mm and a height of about 0.04 mm to 0.4 mm.

Figure 2:
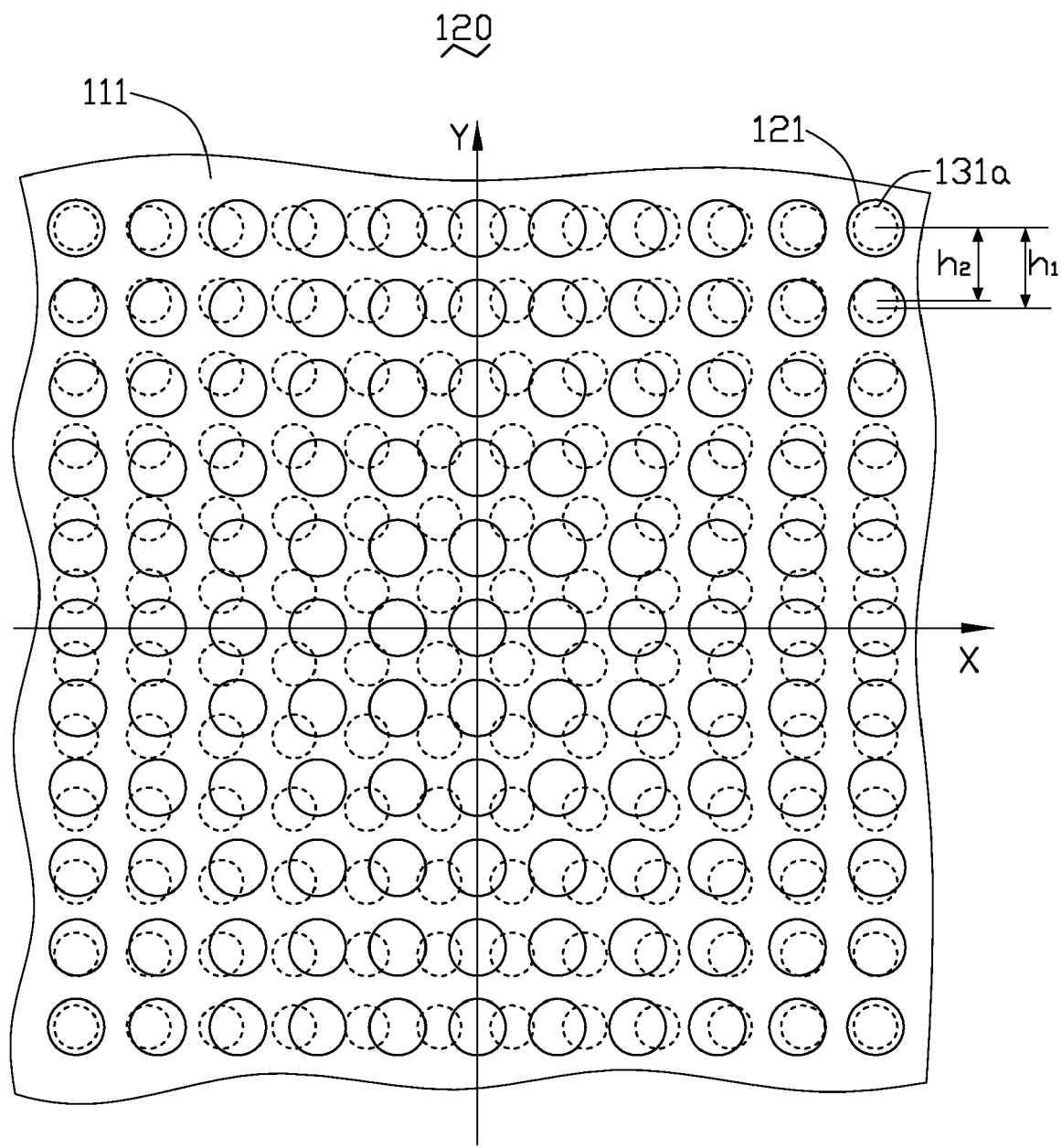
FIG. 2 is an elementary section of a micro lens array of the housing shown in FIG. 1.

The micro lens array 12 is formed by arranging the micro lenses 121 onto the first surface 111 of the transparent substrate 11 in a matrix, e.g., in columns along the X direction and rows along the Y direction shown in FIG. 2 (only a portion of the micro lens array 12 is shown). The micro lens array 12 may preferably be an equidistant rectangular matrix of the micro lenses 121, the row spacing of which is equal to the column spacing thereof, i.e., the distance between every two neighboring rows of the equidistant rectangular matrix is equal to the distance between every two neighboring columns of the equidistant rectangular matrix. The row spacing and/or the column spacing of the micro lens array 120 are less than 1.2 mm.

The decorative layer 13 is an ink coating formed in a decorative pattern. The decorative layer 13 may be a dot matrix of a plurality of ink spots 131, and be formed by applying the ink spots 131 onto the second surface 112 of the transparent substrate 11 in columns along the X direction and rows along the Y direction, e.g., in an equidistant rectangular dot matrix. The dot matrix of the ink spots 131 is similar to the arrangement of the micro lens array 120. The row spacing of the dot matrix of the ink spots 131 is equal to the column spacing thereof. The ink spots 131 may be circular. The diameter of the ink spots 131 is in an approximate rang from 0.25 mm to 1.2 mm. It should be understood that other suitable geometric forms (e.g., squares, ellipses, and triangles) can be employed as the form of the ink spots 131.

The row spacing of the micro lens array 12 symbolized as $h_1$ is different from that of the dot matrix of the ink spots 131 symbolized as $h_2$. The row spacing of the micro lens array 12 should denote a spacing between centers of two neighboring micro lenses 121 in the same column, i.e., a spacing of center to center. $h_1$ and $h_2$ satisfy a following formula: $h_1*N=h_2*(N-1)$ or $h_1*N=h_2*(N+1)$, as "N" symbolizes a natural number in a range from 4 to 300.

FIG. 2 shows an elementary section 120 of the micro lens array 12 on the first surface 111 of the transparent substrate 11, with an upright projection of the dot matrix of the ink spots 131 generated thereon. The upright projection of the dot matrix of the ink spots 131 includes a plurality of image spots 131a of the ink spots 131. Each of the micro lenses 121 positioned at the four corners of the elementary section 120 of the micro lens array 12 has a geometric center superposed with that of one of the image spots 131a of the ink spots 131, with the other micro lenses 121 positioned at the elementary section 120 being staggered to the image spots 131a of the ink spots 131. Due to that $h_1$ and $h_2$ satisfy one of the following formulas: $h_1*N=h_2*(N-1)$ and $h_1*N=h_2*(N+1)$, the number of the image spots 131a of the ink spots 131 in each row and/or column generated on the elementary section 120 is one more or less than that of the micro lenses 121 in each row and/or column of the elementary section 120. That is, from one corner of the elementary section 120 to another corner of the elementary section 120, the geometric centers of the micro lenses 121 are firstly gradually staggered to the image spots 131a of the ink spots 131 and finally gradually superposed with the image spots 131a of the ink spots 131 at the corners of the elementary section 120. An optically duplicate image of the ink spots 131 can be formed under each elementary section 120 of the micro lens array 12. The optically duplicate image of the ink spots 131 can be observed by a viewer and can vary with the view angle of the viewer. As such, the viewer can observe a three-dimension image of the ink spots 131.

The focal length of each of the micro lenses 121 can be symbolized as $I_1$. The focal length of each of the micro lenses 121 and the thickness of the transparent substrate 11 symbolized as $t_1$ may satisfy one of the following formulas: $t_1<I_1$, $I_1<t_1\leqq2\,I_1$, and $t_1>2\,I_1$. When the focal length of each of the micro lenses 121 and the thickness of the transparent substrate 11 symbolized as $t_1$ satisfy the formula of $t_1<I_1$, a magnified duplicate image of the ink spots 131 in optical may be displayed under the transparent substrate 11. When the focal length of each of the micro lenses 121 and the thickness of the transparent substrate 11 symbolized as $t_1$ satisfy the formula of $I_1<t_1\leqq2\,I_1$, a magnified duplicate image of the ink spots 131 in optical may be displayed above the transparent substrate 11. When the focal length of each of the micro lenses 121 and the thickness of the transparent substrate 11 symbolized as $t_1$ satisfy the formula of $t_1>2\,I_1$, a diminished duplicate image of the ink spots 131 in optical may be displayed above the transparent substrate 11.

Figure 3:
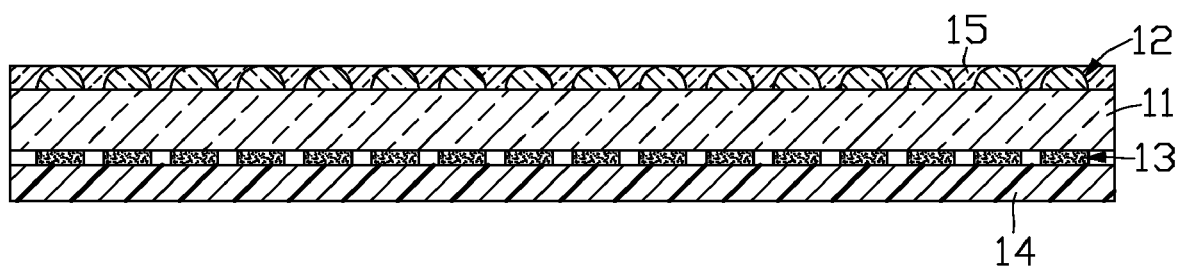
FIG. 3 is a cut-away view of a second embodiment of a housing with three-dimension appearance.

Referring to FIG. 3, in another embodiment, a second housing 20 includes the transparent substrate 11, the micro lens array 12 formed on the first surface 111 of the transparent substrate 11, the decorative layer 13 formed on a second surface 112 of the transparent substrate 11 at an opposite side to the first surface 111, an undercoat 14 covering the decorative layer 13, and a hard coating 15 covering the micro lens array 12.

The undercoat 14 is an ink coating with a color different from that of the decorative layer 13. The undercoat 14 is configured for providing a grounding color for the second housing 20.

The hard coating 15 is a resin coating and configured to protect the micro lens array 12. The hard coating 15 has a hardness more than that of the micro lenses 121 and has a refractive index less than that of the micro lenses 121.

A method for making the second housing 20 is provided. Firstly, the transparent substrate 11 is provided.

Secondly, a decorative ink is applied onto the second surface 112 of the transparent substrate 11 via screen printing process in a dot matrix so as to form the decorative layer 13.

Thirdly, the undercoat 14 is applied onto the decorative layer 13 via spray coating process or screen printing process. The undercoat 14 may be a resin coating or an ink coating. Understandably, the undercoat 14 may also be a decorative resin sheet, which can be applied onto the decorative layer 13 using adhesive.

Figure 4:
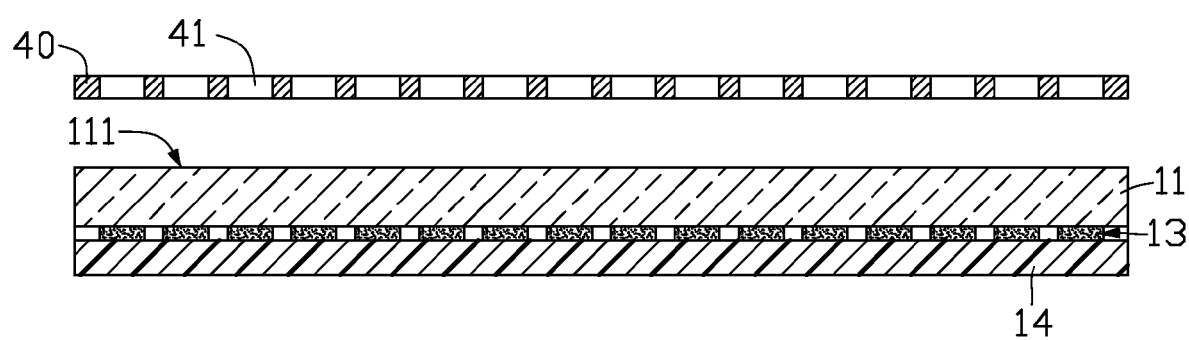
FIG. 4 is a cut-away view of a screen board for making the housing shown in FIG. 3.

Fourthly, referring to FIG. 4, a screen board 40 is provided. The screen board 40 has a plurality of trough holes 41 formed thereon and arranged in an equidistant rectangular matrix.

Fifthly, a liquid of an ultraviolet curable optical polymer is applied onto the screen board in such manner that the liquid of the optical polymer is maintained in the through holes 41 of the screen board 40. The optical polymer mixture should preferably be photosensitive polymer ink, which includes a urethane acrylate component in an approximate range from 55 wt % (percent by weight) to 90 wt %, photo initiators in an approximate range from 5 wt % to 10 wt %, and additives in an approximate range from 5 wt % to 10 wt %.

Sixthly, the transparent substrate 11 is disposed under the screen board 40, with the first surface 111 facing the screen board.

Seventhly, the liquid of the optical polymer maintained in the through holes 41 of the screen board 40 is dropped onto the first surface 111 of the transparent substrate 11 in drops by using a scraping blade to scrape the screen board 40. Thus, an equidistant rectangular matrix of the optical polymer drops with a configuration of hemisphere or spherical segment can be obtained.

Eighthly, the optical polymer drops is cured by irradiation of the ultraviolet light so as to form the micro lens array 12. The cured optical polymer drops can maintain the configuration of hemisphere or spherical segment. Thus, the micro lens array 12 is formed on the transparent substrate 11.

Finally, a hard coating 15 is applied onto the micro lens array 12. The hard coating 15 can be made of hard resin, which has a hardness more than that of the micro lenses 121 and has a refractive index less than that of the micro lenses 121. The hard coating 15 can be formed via spray coating process. Thus, the housing 20 is obtained.

It should be also understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for making a housing, comprising the steps of:
providing a transparent substrate;
applying a decorative ink coating onto a first surface of the substrate; and
forming a micro lens array onto a second surface of the substrate at an opposite side to the first surface via screen printing process,
wherein the screen printing process for forming a micro lens array includes following steps of: providing a screen board that has a plurality of trough holes formed thereon and arranged in an equidistant rectangular matrix; applying a liquid of an ultraviolet curable optical polymer onto the screen board in such manner that the liquid of the optical polymer is maintained in the trough holes of the screen board; disposing the transparent under the screen board, with the first surface facing the screen board; scraping the screen board by using a scraping blade so as to make the liquid of the optical polymer maintained in the through holes of the screen board drop onto the first surface of the substrate in drops; curing the optical polymer drops by irradiation of the ultraviolet light so as to form the micro lens array.

* * * * *